Patented Dec. 10, 1946

2,412,200

UNITED STATES PATENT OFFICE 2,412,200

HECTOGRAPH MASS

Robert D. Blum, Jr., Nashville, Tenn.

No Drawing. Application September 12, 1941,
Serial No. 410,653

19 Claims. (Cl. 117—35.6)

This invention relates to a duplicating composition or hectograph mass, and has for an object to generally and materially improve the slab or pad used for manifolding or duplicating purposes.

In practicing the invention, I substitute the heretofore commonly used glycerin-gelatin type of slab or mass with a composition embodying an aliphatic compound rich in hydroxyls, preferably a polyhydroxy alcohol, gelled by the action of a substance capable of forming olate ions in an aqueous solution. Some compounds which are capable of forming olate ions include the following: antimony compounds, specifically antimony trifluoride, antimony oxide, potassium pyro antomonate, other antimony halides, tartar emetic, antimony sodium floride, etc.; chromium compounds, specifically chromium acetate, chromium halides, bichromates, etc.; copper-ammonia compounds, zinc-ammonia compounds, lead tetraethyl, some compounds of boron, iron, zinc, cobalt, tin, copper, beryllium, aluminum, nickel, zirconium, thorium, vanadium and titanium.

The mass or slab attains an elastic, rubber-like nature and a toughness not possible by using gelatin, starch or like amylaceous material or polyhydroxy alcohol alone or in conjunction with one another. These characteristics are apparently brought about by the chemical reaction of the antimony trifluoride and a polyhydroxy alcohol, specifically polyvinyl alcohol. Compounds such as antimony trifluoride, etc. form olate ions. These olate ions have aquo and hydroxo groups which under certain conditions can be displaced by hydroxyls such as exist in polyhydric alcohols like starch, cellulose, glycerol, polyvinyl alcohols, hydroxy acids, etc., or any compound containing hydroxyls. Tests have shown that if a few milliliters of aqueous solution such as antimony trifluoride be introduced in a glycerol-polyvinyl alcohol mix and heat is applied, some of the hydroxyls of several large polyvinyl alcohol molecules will enter into an antimony trifluoride complex and thus several of the already large molecules will be held together, and as oxolation proceeds, a tough gel results. In a system as rich in hydroxyls as that above stated, much hydrogen bonding between glycerin and polyvinyl alcohol and water is sure to take place, and after oxolation the hydrogen bonding is even more pronounced, and moisture leaves the system reluctantly.

It will thus be seen that I use the solid or high molecular weight polyhydroxy alcohols, such as polyvinyl alcohol and/or starch in conjunction with compounds such as antimony trifluoride or other substance capable of forming olate ions in an aqueous solution to replace the gelatin as the solid material in the mass.

General formula

|  | Parts by weight |
|---|---|
| Polyhydric aliphatic compound | 4.0–16.0 |
| Hygroscopic agents and carriers | 50.0–80.0 |
| Olate ion forming compound | 0.2– 2.0 |
| Water | 5.0–20.0 |
| Pigment | 5.0–20.0 |
| Intensifier (optional). | |

Specific formula

|  | Parts by weight |
|---|---|
| Polyvinyl alcohol (med. viscosity—#428) | 15.0 |
| Glycerol | 50.7 |
| Antimony trifluoride in aqueous solution, 20% concentration | 0.3 |
| Pigment (TiO$_2$) | 4.0 |

Heat 135°–165° C. for 30 min., cool 90–95°, then add:

|  | |
|---|---|
| Ethylene glycol | 13.0 |
| Water | 13.0 |
| Calcium chloride | 4.0 |

The alcohol and pigment (and any other solids) may be thoroughly mixed and blended, after which about 75% of the glycerol, water and calcium chloride may be added while agitating the mass. The antimony trifluoride is then incorporated and the ingredients agitated until homogeneous, then heated to 135°–170° C. for about thirty minutes while gently agitating or stirring, allowed to cool to 95°–90° C., and the remainder of the glycerol, water and calcium chloride added slowly while stirring until homogeneous.

The mixture may be held for 12 to 24 hours at 85° to 90° C. before pouring. It is to be preferred however to pour as soon as possible after adding the remainder of the hygroscopic agent or agents since the water evaporates and the reaction of the antimony trifluoride with polyvinyl alcohol and the lower molecular weight polyhydric alcohols (glycerol and glycols) is progressive, proceeding to a slight degree at a temperature of 90° to 95° C.

Solidification begins at about 80° C., the approximate melting point of a typical mass.

The mass may be poured onto a slab and molded, using flat polished glass or metal plates for printing surface and an ordinary flat surface for bottom next to backing, which may be cloth or fibre.

If the mass is kept hot (90°–95° C.) it may be poured onto the backing and allowed to settle thus forming a smooth printing surface without the use of a top plate. The latter method is adaptable to a continuous process method of production, which would involve refrigeration equipment to bring the temperature down rapidly and thus hasten solidification.

Without refrigeration, the mass will set in from 1 to 12 hours, varying with formulae, time of heating, etc.

Experimentation has shown that the above formulae may be varied or changed, depending upon the desired properties of the resultant gel. Lower viscosities of polyvinyl alcohol may be used but a greater amount would be required. Higher viscosities are preferable since the density of the mass is reduced and the cost lessened.

The amount of water preferably ranges between 15 and 20%; above that amount instability to humidity changes results since water is the most volatile material present. Penetration varies proportionally with amount of water present, as does intensity of reproduction exclusive of effect of intensifiers.

Antimony trifluoride or olate ion forming compound is used ordinarily in concentration of about 0.3% of total mass. Excess results in more rapid and complete setting of gel; though hygroscopic agents are accordingly affected simultaneously. Reduction of amount causes delay or incomplete setting of gel.

As oxolation of the hygroscopic polyhydric alcohols (glycerol and glycols) proceeds, the hygroscopicity of these materials seems to be affected and the capacity for absorption of moisture is lessened by this reaction. Therefore a part of the hygroscopic material is added only after conditions favorable to further reaction are minimized (temperature is brought down, also no excess of olate ions is available to enter into reaction). This precaution is necessary in order to assure an adequate replenishment of moisture in the system as it is used up.

In a system as rich in hydroxyls as that stated in above formulae, much hydrogen bonding between glycerin and polyvinyl alcohol and water is sure to take place; after oxolation the hydrogen bonding is even more pronounced, and moisture leaves the system reluctantly. Substances containing the $NH_2$ group, such as urea, or substances containing any group which lends itself to hydrogen bonding, are useful in the system as they tend to stabilize the available moisture by holding a large reserve that can be drawn upon as the moisture is used up.

The following significant observations were further made concerning the use of carriers and modifying agents in the composition of the mass:

Ethylene glycol, in addition to serving as satisfactory carrier and hygroscopic agent, seems to serve as intensifier when used in conjunction with glycerin. However this method of intensification does not compare favorably on cost basis with other methods, since other intensifiers are used in smaller quantities.

Thin boiling starch can be used in conjunction with polyvinyl alcohol in formula to aid in reaching desired body and to cut down cost of mass. Excess results in weakening of film strength of gel.

Dextrose can be used in small quantities as carrier and hygroscopic agent but quantity must be limited, otherwise it reduces strength of the gel and intensity of copies.

Pigments, inert, much as $TiO_2$, give desired opacity covering up dye as penetration occurs, give increased body at low cost, reduce tackiness. Excess makes mass too dense and results in "sweating" or "bleeding."

"Carbitol" (diethylene glycol monoethyl ether) aids penetration and intensity of transcript reproduction, reduces tackiness. Softens gel if used in concentration greater than 10 to 15 per cent and also causes "bleeding."

Urea theoretically should aid stability to variations in humidity, though this has not been satisfactorily demonstrated by experiment.

Diethylene glycol softens gel and decreases strength.

Triethylene glycol expedites solidification of gel.

Calcium chloride used satisfactorily as hygroscopic agent and found to be best material for purpose of imparting desired tackiness to mass. When used in excess (over 5 per cent) causes softening of gel and delays solidification.

Water is necessary in the oxolation reaction. Amount given in formula may be varied, within limitation. If excess is used, instability to humidity changes results since water is the most volatile material present in the formula. Intensity varies directly with amount of water, as does penetration. Excess results also in softening of gel and delay in solidification.

The slabs prepared from formulae given above may be used in the conventional manner. The so-called "master" copy, or the copy from which transcripts are to be made, may be prepared by the use of methyl violet (malachite green, nigrosine black, etc.) ink or pencil or by other means to produce the writing or drawing to be transcribed. The duplication process is accomplished mechanically by various means, utilizing the gel or mass as the basis of the duplicating medium.

Actual experience with a slab or gel mass constructed as above set forth shows that it has certain inherent advantages over the conventional gelatin mass, among which may be mentioned:

Slab has greater elasticity and toughness, resulting in greater resistance to abrasion and damage of printing surface, and in longer wear.

Mass requires a maximum of twenty-four hours of aging in order to set the gel. By means of refrigeration, setting can take place in less than one hour, making possible a continuous process of manufacture.

More rapid penetration of dye into slab, making slab available for reproduction again within short length of time.

Greater stability to variations in humidity.

Requires no additional binder in order to make a bond with cloth or fibre backing. Natural adhering bond is formed by mass.

Higher softening and melting point—does not soften at ordinary temperatures, making possible its use near radiators or in high temperatures encountered in tropical climates.

Not subject to bacterial decomposition, attack by fungi, by rodents, or by insects.

Gel may be used in thin layer because of its cohesive and relatively tough quality.

Being composed primarily of synthetic components, the mass is more uniform than those made with natural proteins.

More compatible with various modifying agents, making possible wider use of same, for instance intensifiers.

Less subject to tanning and other undesirable physical and chemical changes.

Another method of obtaining the characteristic gel is by the use of a high molecular weight polyhydroxy alcohol, such as polyvinyl alcohol, with other reagents which are recognized as "insolubilizers" of polyvinyl alcohol. If these "insolubilizers" are used in moderation with polyvinyl alcohol (quantity is limited or reaction suppressed in some other manner) a gel is obtained which resembles in properties the mass attained by the reaction with a substance which forms olate ions (an ol-compound). Some of the insolubilizers which may be used in this manner and which make a tough elastic mass with polyvinyl alcohol are: formaldehyde, paraformaldehyde and other aldehydes, acetic paraldehyde, trioxymethylene, dimethylol urea, dichromates, certain dyestuffs, including Congo red dyes, dibasic acids, copper ammonia compounds, zinc-ammonia compounds, aliphatic organic acids and their salts, acids, esters, amides, and nitriles.

The treatment may also be carried out by means of a variety of substances which are recognized as albumin precipitants, including tanning agents, heavy metals, and certain heavy metal compounds, or mixtures of these. Specifically, copper, iron, zinc, tin, antimony, cobalt and tannic acid.

The invention also contemplates the combination of a compound comprising polyvinyl alcohol and an olate ion forming compound with gelatin, casein, albumen or the like.

Other modifications and substitutions in ingredients for effecting the desired results within the teaching of the invention are contemplated, the invention being limited only by the scope of the appended claims.

What is claimed is:

1. A duplicating pad for hectograph work comprising the following: polyvinyl alcohol approximately 15 parts by weight, glycerol approximately 50.7 parts by weight, antimony trifluoride approximately 0.2 to 2.0 parts by weight, titanium dioxide pigment approximately 4 parts by weight, ethylene glycol approximately 13 parts by weight, calcium chloride approximately 4 parts by weight.

2. A duplicating pad for hectograph work comprising a polyvinyl alcohol of between 4.0 and 16.0 parts by weight, glycerol between 50.0 and 80.0 parts by weight, an antimony halide 0.2 to 2.0 parts by weight, water, and a pigment 5.0 to 20.0 parts by weight.

3. A duplicating pad for hectograph work comprising polyvinyl alcohol approximately 15 parts by weight, glycerol between 50.0 and 80.0 parts by weight, an antimony halide 0.2 to 2.0 parts by weight, water, and a pigment 5.0 to 20.0 parts by weight.

4. A duplicating pad for hectograph work comprising a polyvinyl alcohol of between 4.0 and 16.0 parts by weight, glycerol approximately 50.7 parts by weight, an antimony halide 0.2 to 2.0 parts by weight, water, and a pigment 5.0 to 20.0 parts by weight.

5. A duplicating pad for hectograph work comprising a polyvinyl alcohol of between 4.0 and 16.0 parts by weight, calcium chloride in amounts less than 25 parts by weight, an antimony halide 0.2 to 2.0 parts by weight, water, and a pigment 5.0 to 20.0 parts by weight.

6. A duplicating pad for hectograph work comprising a polyvinyl alcohol of between 4.0 and 16.0 parts by weight, ethylene glycol between 50.0 and 80.0 parts by weight, an antimony halide 0.2 to 2.0 parts by weight, water, and a pigment 5.0 to 20.0 parts by weight.

7. A duplicating pad for hectograph work comprising a polyvinyl alcohol of between 4.0 and 16.0 parts by weight, glycerol between 50.0 and 80.0 parts by weight, an inorganic salt of antimony 0.2 to 2.0 parts by weight, water, and a pigment 5.0 to 20.0 parts by weight.

8. A duplicating pad for hectograph work comprising a polyvinyl alcohol of between 4.0 and 16.0 parts by weight, glycerol between 50.0 and 80.0 parts by weight, antimony trifluoride 0.2 to 2.0 parts by weight, water, and a pigment 5.0 to 20.0 parts by weight.

9. A duplicating pad for hectograph work comprising a polyvinyl alcohol of between 4.0 and 16.0 parts by weight, glycerol approximately 50.0 and 80.0 parts by weight, an antimony halide 0.2 to 2.0 parts by weight, water, and titanium dioxide approximately 4.0 parts by weight.

10. A duplicating pad for hectograph work comprising polyvinyl alcohol approximately 15 parts by weight, glycerol approximately 50.7 parts by weight, antimony trifluoride 0.2 to 2.0 parts by weight, water, and titanium dioxide approximately 4.0 parts by weight.

11. The process of forming a hectograph pad which consists in blending polyvinyl alcohol approximately 15 parts by weight with a pigment 5.0 to 20.0 parts by weight, adding glycerol approximately 50.7 parts by weight, incorporating antimony trifluoride 0.2 to 2.0 parts by weight, and stirring the same to render the mixture homogeneous.

12. The process of forming a hectograph pad which consists in blending polyvinyl alcohol approximately 15 parts by weight with a pigment 5.0 to 20.0 parts by weight, adding glycerol approximately 50.7 parts by weight, incorporating antimony trifluoride 0.2 to 2.0 parts by weight, heating the mass between 135 and 173° C., cooling the mass to approximately 95 to 90° C., and then spreading the mixture thus formed on a backing.

13. The process of forming a hectograph pad which consists in blending polyvinyl alcohol approximately 15 parts by weight with a pigment 5.0 to 20.0 parts by weight, adding glycerol approximately 50.7 parts by weight, incorporating antimony trifluoride 0.2 to 2.0 parts by weight, heating the mixture to approximately 135 to 173° C. for approximately thirty minutes, then allowing the mixture to cool to approximately 95 to 90° C., and spreading the mixture thus formed onto a backing.

14. The process of forming a hectograph pad which consists in blending polyvinyl alcohol approximately 15 parts by weight with a pigment 5.0 to 20 parts by weight, adding antimony trifluoride 0.2 to 2.0 parts by weight, incorporating ethylene glycol between 50.0 and 80.0 parts by weight, and stirring the same to render the mixture homogeneous, and spreading the mixture thus formed onto a backing.

15. The process of forming a hectograph pad which consists in blending polyvinyl alcohol approximately 15 parts by weight with a pigment 5.0 to 20 parts by weight, adding antimony trifluoride 0.2 to 2.0 parts by weight, incorporating glycerol between 50.0 and 80.0 parts by weight, and stirring the same to render the mixture homogeneous, and spreading the mixture thus formed onto a backing.

16. The process of forming a hectograph pad which consists in blending polyvinyl alcohol approximately 15 parts by weight with a pigment 5.0 to 20 parts by weight, adding glycerol between 50.0 and 80.0 parts by weight, incorporating an antimony halide 0.2 to 2.0 parts by weight, and stirring the same to render the mixture homogeneous, and spreading the mixture thus formed onto a backing.

17. The process of forming a hectograph pad which consists in blending polyvinyl alcohol approximately 15 parts by weight with a pigment 5.0 to 20 parts by weight, adding glycerol between 50.0 and 80.0 parts by weight, incorporating an inorganic salt of antimony 0.2 to 2.0 parts by weight, and stirring the same to render the mixture homogeneous, and spreading the mixture thus formed onto a backing.

18. A duplicating pad for hectograph work comprising a polyvinyl alcohol of between 4.0 and 16.0 parts by weight, glycerol between 50.0 and 80.0 parts by weight, potassium pyroantimonate 0.2 to 2.0 parts by weight, water, and a pigment 5.0 to 20.0 parts by weight.

19. The process of forming a hectograph pad which consists in blending polyvinyl alcohol approximately 15 parts by weight with a pigment 5.0 to 20 parts by weight, adding a hygroscopic agent from the group consisting of glycerol and ethylene glycol in the amount between 50.0 and 80.0 parts by weight, incorporating an inorganic salt of antimony 0.2 to 2.0 parts by weight, and stirring the same to render the mixture homogeneous and spreading the mixture thus formed onto a backing.

ROBERT D. BLUM, Jr.